(12) United States Patent
Tamrakar et al.

(10) Patent No.: US 10,735,071 B2
(45) Date of Patent: Aug. 4, 2020

(54) CHANNEL STATE INFORMATION RECEIVING METHOD, CHANNEL STATE INFORMATION FEEDBACK METHOD, DEVICE, BASE STATION AND TERMINAL

(71) Applicant: CHINA ACADEMY OF TELECOMMUNICATIONS TECHNOLOGY, Beijing (CN)

(72) Inventors: Rakesh Tamrakar, Beijing (CN); Qiubin Gao, Beijing (CN); Wenhong Chen, Beijing (CN); Runhua Chen, Beijing (CN); Hui Li, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 15/760,582

(22) PCT Filed: Aug. 31, 2016

(86) PCT No.: PCT/CN2016/097653
§ 371 (c)(1),
(2) Date: Mar. 15, 2018

(87) PCT Pub. No.: WO2017/045531
PCT Pub. Date: Mar. 23, 2017

(65) Prior Publication Data
US 2019/0044597 A1 Feb. 7, 2019

(30) Foreign Application Priority Data
Sep. 18, 2015 (CN) .......................... 2015 1 0600159

(51) Int. Cl.
*H04B 7/06* (2006.01)
*H04W 72/04* (2009.01)
*H04L 5/00* (2006.01)

(52) U.S. Cl.
CPC ......... *H04B 7/0626* (2013.01); *H04L 5/0037* (2013.01); *H04L 5/0057* (2013.01); *H04W 72/04* (2013.01); *H04W 72/042* (2013.01)

(58) Field of Classification Search
CPC .................................................... H04B 7/0626
See application file for complete search history.

(56) References Cited

U.S. PATENT DOCUMENTS

| 2008/0214219 A1* | 9/2008 | Matsushima ........ A61B 5/0002 455/500 |
| 2012/0142391 A1* | 6/2012 | Kwon ..................... H04W 4/08 455/519 |

(Continued)

FOREIGN PATENT DOCUMENTS

| CN | 102158971 A | 8/2011 |
| CN | 102740447 A | 12/2012 |

(Continued)

OTHER PUBLICATIONS

From EP app. No. 16845645.7, Extended European Search Report dated Sep. 14, 2018.

(Continued)

*Primary Examiner* — Kevin M Cunningham
(74) *Attorney, Agent, or Firm* — Ladas & Parry, LLP

(57) ABSTRACT

A channel state information receiving method, a channel state information feedback method, a device, a base station and a terminal are provided. It is related to telecommunication field. The receiving method includes: obtaining group identifiers of groups into which multiple terminals having accessed to a base station are classified; transmitting a triggering signaling to one group of terminals having an identical group identifier; and receiving, on a pre-configured resource block, pieces of channel state information respectively fed back by the group of terminals having the identical group identifier in response to the triggering signaling. With (Continued)

the above technical solution, consumption of downlink signalings of the base station can be reduced and feedback efficiency of channel state information can be improved.

5 Claims, 8 Drawing Sheets

(56) References Cited

U.S. PATENT DOCUMENTS

| | | | |
|---|---|---|---|
| 2012/0309402 A1 | 12/2012 | Cheng et al. | |
| 2014/0105055 A1* | 4/2014 | Kang | H04W 24/10 370/252 |
| 2015/0244444 A1* | 8/2015 | Mazzarese | H04B 7/04 370/252 |
| 2015/0319633 A1* | 11/2015 | Ji | H04B 7/0452 370/252 |
| 2016/0174194 A1 | 6/2016 | Suzuki et al. | |
| 2016/0198453 A1* | 7/2016 | Hu | H04L 69/324 370/349 |

FOREIGN PATENT DOCUMENTS

| | | |
|---|---|---|
| CN | 103095419 A | 5/2013 |
| CN | 104144502 A | 11/2014 |
| WO | 2015002656 A1 | 1/2015 |
| WO | 2015017983 A1 | 2/2015 |
| WO | 2015035611 A1 | 3/2015 |

OTHER PUBLICATIONS

From PCT/CN2016/097653, International Preliminary Report on Patentability, dated Mar. 20, 2018 with English translation provided by WIPO.
From PCT/CN2016/097653, Written Opinion of the International Search Authority, dated Nov. 28, 2016 with English translation provided by WIPO.
International Search Report for PCT/CN2016/097653 dated Nov. 28, 2016 and its English translation provided by WIPO.
Written Opinion of the International Search Authority PCT/CN2016/097653 dated Nov. 28, 2016 and its English translation provided by Google Translate.

* cited by examiner

CHANNEL STATE INFORMATION RECEIVING METHOD, CHANNEL STATE INFORMATION FEEDBACK METHOD, DEVICE, BASE STATION AND TERMINAL

CROSS-REFERENCE TO RELATED APPLICATIONS

The present application is the U.S. national phase of PCT Application PCT/CN2016/097653 filed on Aug. 31, 2016 which claims the priority to Chinese Patent application No. 201510600159.1 filed on Sep. 18, 2015, the disclosures of which are incorporated herein by reference in their entireties.

TECHNICAL FIELD

The present disclosure relates to the field of telecommunication technology, and more particularly, to a channel state information receiving method, a channel state information feedback method, a device, a base station and a terminal.

BACKGROUND

In a cellular system of related technology, an antenna array of a base station is usually provided with horizontally arranged arrays as shown in FIG. 1 and FIG. 2. A beam at an emitting end of the base station can only be adjusted in the horizontal direction, while the beam is provided with a fixed downtilt in the vertical direction; hence, various beam-forming techniques or pre-coding techniques are based on channel state information in the horizontal direction. However, since wireless signals are transmitted in three-dimensional way in space, optimum system performance cannot be achieved with fixed downtilt.

Beam adjustment in the vertical direction is meaningful to reduction of inter-cell interference and improvement of system performance. As antenna technology develops, in the industry, each oscillator of an active antenna can be controlled independently, as shown in FIG. 3 and FIG. 4. With such three-dimensional antenna array, signals transmitted by the base station can be beam-formed for UE both in the horizontal direction and in the vertical direction. Such antenna array enables dynamic adjustment of beam in the vertical direction.

For accurately orienting the beam to the UE in the vertical direction and thereby achieving maximum beam-forming gain, one common way for the base station to determine a beam-forming vector in the vertical direction requires the UE to feed back channel state information (CSI) in the vertical direction. In another way, the UE is configured with multiple CSI feedback configurations adopting different vertical beam-forming vectors respectively, the UE performs CSI feedback based on an optimum CSI feedback configuration and informs the base station of corresponding location information (i.e., informs the base station of a particular vertical beam-forming vector corresponding to the optimum CSI feedback configuration), such that the base station may utilize an optimum vertical beam-forming vector to perform vertical beam-forming.

The maximum beam-forming gain is detailed as follows.

Firstly, the base station determines N non-zero power channel state information reference signal (NZP CSI-RS) resources. A quantity of ports of each CSI-RS resource is identical to a quantity of groups of antenna elements. Each port of one CSI-RS resource corresponds to one group of antenna elements, for example, a first port corresponds to a first column of vertical antennas, a second port corresponds to a second column of vertical antennas, and so forth.

The base station determines one beam-forming weight vector for each CSI-RS resource, where the beam-forming weight vector can be determined based on a vertical angle to be covered by the CSI-RS resource. For each port of the CSI-RS resource, a pilot signal at the port is weighted by the beam-forming vector and then transmitted from one group of antenna elements corresponding to the port. For example as shown in FIG. 5, there are 16 antenna elements. Four antenna elements in the vertical direction are classified into one group. There are four groups of antenna elements and each group includes four antenna elements. Each group of antenna elements is used to transmit a pilot signal at one port of the CSI-RS resource. A pilot signal $S_n(i)$ at an i-th port is weighted by a beam-forming weight vector $[W_n(0)W_n(1)W_n(2)\ W_n(3)]^T$ and then transmitted from an i-th group of antenna elements, i.e., an i-th column of antennas. In FIG. 5, the subscript n is for distinguishing CSI-RS resources. Beams for various CSI-RS resources have different directions, usually, three different beam-forming weight vectors $[W_n(0)W_n(1)W_n(2)W_n(3)]^T$ with n equals 0, 1 and 2 are configured and the UE may perform measurements based on three CSI-RS resources corresponding to the three beam-forming weight vectors. The UE may report CSI measured on a CSI-RS resource having an optimum channel quality and location information of the CSI-RS resource in all configured CSI-RS resources. The base station can obtain a current optimum vertical beam-forming weight vector based on the location information and perform vertical beam-forming using the current optimum vertical beam-forming weight vector.

In practical, the UE may report location information and CSI corresponding to multiple optimum CSI feedback configurations and the base station selects one vertical beam or several different vertical beams for downlink data transmission. Here, the UE may further need to report a quantity of CSI feedback configurations corresponding to the currently reported CSI and location information, i.e., a total quantity of pieces of CSI that are fed back, or the UE may further need to report a quantity of CSI feedback configurations proposed for the base station.

A CSI feedback of the UE may be a periodic CSI feedback using a physical uplink control channel (PUCCH) or an aperiodic CSI feedback using a physical uplink shared channel (PUSCH). In the periodic CSI feedback, the base station configures a periodic PUCCH resource and the UE reports corresponding CSI on the configured resource periodically. In the aperiodic CSI feedback, the base station triggers the UE to perform CSI feedback via downlink control information (DCI) and the UE performs CSI feedback on a PUSCH in an uplink subframe corresponding to a triggered subframe. A CSI process set is pre-configured for the UE via a high layer signaling and the triggering process is achieved using the DCI. By configuring multiple CSI process sets, the UE can feed back pieces of CSI corresponding to multiple CSI-RS that are beam-formed by different vertical beam-forming vectors.

In the aperiodic CSI feedback, when triggering terminals to perform CSI feedback, the base station needs to transmit different control signalings for different terminals, and each terminal performs CSI feedback after receiving the control signaling for the terminal. However, this approach leads to large consumption of downlink signalings from the base station.

SUMMARY

The present disclosure intends to provide a channel state information receiving method, a channel state information feedback method, a device, a base station and a terminal.

Some embodiments of the present disclosure provides a channel state information receiving method, including: obtaining group identifiers of groups into which multiple terminals having accessed to a base station are classified; transmitting a triggering signaling to one group of terminals having an identical group identifier; and receiving, on a pre-configured resource block, pieces of channel state information respectively fed back by the group of terminals having the identical group identifier based on the triggering signaling.

Optionally, the group identifiers are assigned by: assigning one group identifier for each terminal accessing to the base station using a formula: group identifier=M Mod N1, where M is a total quantity of terminals having accessed to the base station recorded by the base station at a time instant when each terminal accesses to the base station, N1 is a total quantity of groups configured by the base station for the multiple terminals having accessed to the base station, and Mod refers to a remainder calculation; or randomly assigning a group identifier for at least one terminal among the multiple terminals having accessed to the base station; or assigning one group identifier for each terminal accessing to the base station using a formula: group identifier=terminal identifier Mod N1, where N1 is a total quantity of groups configured by the base station for the multiple terminals having accessed to the base station and Mod refers to a remainder calculation.

Optionally, the transmitting the triggering signaling to one group of terminals having the identical group identifier includes: transmitting the triggering signaling carrying the group identifier to all terminals in the group corresponding to the group identifier.

Optionally, the triggering signaling includes downlink control information (DCI) or a static control signaling or a semi-static control signaling.

Optionally, the transmitting the triggering signaling carrying the group identifier to all terminals in the group corresponding to the group identifier includes: scrambling the triggering signaling carrying the group identifier using a predetermined scramble code to generate a scrambled triggering signaling, wherein the predetermined scramble code is obtained based on the group identifier; and transmitting the scrambled triggering signaling to all terminals in the group corresponding to the group identifier.

Optionally, the triggering signaling further includes a size of the pre-configured resource block, location information of the pre-configured resource block in a resource set configured by the base station, and triggering state information used to trigger the terminals to feed back channel state information.

Optionally, the receiving, on the pre-configured resource block, the pieces of channel state information respectively fed back by the group of terminals having the identical group identifier based on the triggering signaling includes: receiving, on the pre-configured resource block, the pieces of channel state information reported by the group of terminals having the identical group identifier based on the triggering signaling and a preset multiplexing rule. The preset multiplexing rule includes time division multiplexing, frequency division multiplexing, code division multiplexing and time-frequency-code multiplexing.

Optionally, after the receiving, on the pre-configured resource block, the pieces of channel state information respectively fed back by the group of terminals having the identical group identifier based on the triggering signaling, the channel state information receiving method further includes: analyzing the pieces of channel state information received on an identical pre-configured resource block.

Some embodiments of the present disclosure provide a channel state information receiving device, including: a first obtaining module, configured to obtain group identifiers of groups into which multiple terminals having accessed to a base station are classified; a transmitting module, configured to transmit a triggering signaling to one group of terminals having an identical group identifier; and a first receiving module, configured to receive, on a pre-configured resource block, pieces of channel state information respectively fed back by the group of terminals having the identical group identifier based on the triggering signaling.

Optionally, the group identifiers are assigned by: assigning one group identifier for each terminal accessing to the base station using a formula: group identifier=M Mod N1, where M is a total quantity of terminals having accessed to the base station recorded by the base station at a time instant when each terminal accesses to the base station, N1 is a total quantity of groups configured by the base station for the multiple terminals having accessed to the base station, and Mod refers to a remainder calculation; or randomly assigning a group identifier for at least one terminal among the multiple terminals having accessed to the base station; or assigning one group identifier for each terminal accessing to the base station using a formula: group identifier=terminal identifier Mod N1, where N1 is a total quantity of groups configured by the base station for the multiple terminals having accessed to the base station and Mod refers to a remainder calculation.

Optionally, the transmitting module is configured to transmit the triggering signaling carrying the group identifier to all terminals in the group corresponding to the group identifier.

Optionally, the transmitting module includes: a scrambling unit, configured to scramble the triggering signaling carrying the group identifier using a predetermined scramble code to generate a scrambled triggering signaling, wherein the predetermined scramble code is obtained based on the group identifier; and a transmitting unit, configured to transmit the scrambled triggering signaling to all terminals in the group corresponding to the group identifier.

Some embodiments of the present disclosure provide a base station, including a processor and a memory connected to the processor via a bus interface. The memory is configured to store program and data used by the processor when the processor executes operations. When calling the data and executing the program stored in the memory, the processor implements the following functional modules: a first obtaining module, configured to obtain group identifiers of groups into which multiple terminals having accessed to a base station are classified; a transmitting module, configured to transmit a triggering signaling to one group of terminals having an identical group identifier; and a first receiving module, configured to receive, on a pre-configured resource block, pieces of channel state information respectively fed back by the group of terminals having the identical group identifier based on the triggering signaling.

Some embodiments of the present disclosure provide a channel state information feedback method, including: obtaining a group identifier of a group to which a terminal belongs; receiving a triggering signaling transmitted by a base station; and feeding back, on a pre-configured resource block corresponding to the group identifier, channel state information of the terminal to the base station according to the triggering signaling, wherein the pre-configured resource block is allocated by the base station for all terminals in the group corresponding to the group identifier.

Optionally, the obtaining the group identifier of the group to which the terminal belongs includes: obtaining the group identifier that is assigned by the base station for the terminal using a formula: group identifier=M Mod N1, where M is a total quantity of terminals having accessed to the base station recorded by the base station at a time instant when the terminal accesses to the base station, N1 is a total quantity of groups configured by the base station for multiple terminals having accessed to the base station, and Mod refers to a remainder calculation; or obtaining the group identifier that is randomly assigned by the base station for the terminal accessing to the base station; or obtaining the group identifier of the terminal using a formula: group identifier=terminal identifier Mod N1, where N1 is a total quantity of groups configured by the base station for multiple terminals having accessed to the base station and Mod refers to a remainder calculation.

Optionally, the feeding back, on the pre-configured resource block corresponding to the group identifier, the channel state information of the terminal to the base station according to the triggering signaling includes: feeding back, on the pre-configured resource block corresponding to the group identifier, the channel state information of the terminal to the base station according to the triggering signaling and using a preset multiplexing rule. The preset multiplexing rule includes time division multiplexing, frequency division multiplexing, code division multiplexing and time-frequency-code multiplexing.

Some embodiments of the present disclosure provide a channel state information feedback device, including: a second obtaining module, configured to obtain a group identifier of a group to which a terminal belongs; a second receiving module, configured to receive a triggering signaling transmitted by a base station; and a feedback module, configured to feed back, on a pre-configured resource block corresponding to the group identifier, channel state information of the terminal to the base station according to the triggering signaling, where the pre-configured resource block is allocated by the base station for all terminals in the group corresponding to the group identifier.

Some embodiments of the present disclosure provide a terminal, including: a processor and a memory connected to the processor via a bus interface. The memory is configured to store program and data used by the processor when the processor executes operations. When calling the data and executing the program stored in the memory, the processor implements the following functional modules: a second obtaining module, configured to obtain a group identifier of a group to which a terminal belongs; a second receiving module, configured to receive a triggering signaling transmitted by a base station; and a feedback module, configured to feed back, on a pre-configured resource block corresponding to the group identifier, channel state information of the terminal to the base station according to the triggering signaling, wherein the pre-configured resource block is allocated by the base station for all terminals in the group corresponding to the group identifier.

Beneficial effects of the preset disclosure are described as follows. In the above solutions, each terminal accessing to the base station is classified into a group in advance, the base station transmits a triggering signaling to trigger a group of terminals to feed back channel state information, and pieces of channel state information reported by multiple terminals classified into one group can be received on the same resource block. Hence, consumption of downlink signalings of the base station is reduced and feedback efficiency of channel state information is improved.

DETAILED DESCRIPTION

For clarifying objectives, technical solutions and beneficial effects of the present disclosure, detailed descriptions are given hereinafter based on embodiments in conjunction with drawings.

Regarding the problem that one downlink signaling transmitted by the base station in related technology can only trigger one terminal to report channel state information, the present disclosure provides a channel state information receiving method, a channel state information feedback method, a device, a base station and a terminal, to reduce consumption of downlink signalings from the base station and improve channel state information feedback efficiency.

Figure 1:
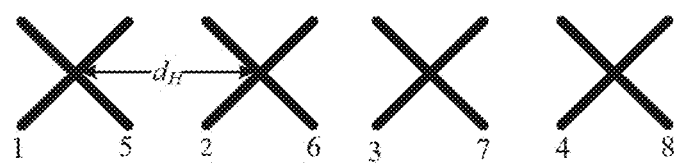
FIG. 1 is a schematic diagram of dual-polarized antennas that are horizontally arranged in related technology.
Figure 2:
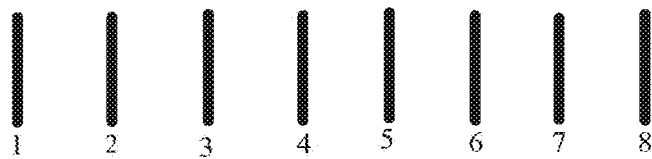
FIG. 2 is a schematic diagram of linear array antennas that are horizontally arranged in related technology.
Figure 3:
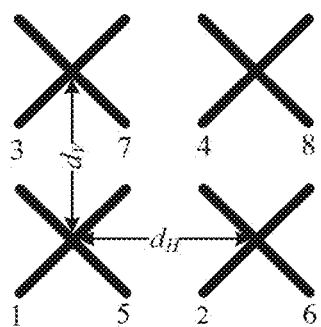
FIG. 3 is a schematic diagram of dual-polarized antennas that are horizontally and vertically arranged in related technology.
Figure 4:
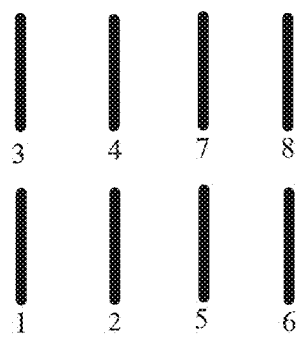
FIG. 4 is a schematic diagram of linear array antennas that are horizontally and vertically arranged in related technology.
Figure 5:
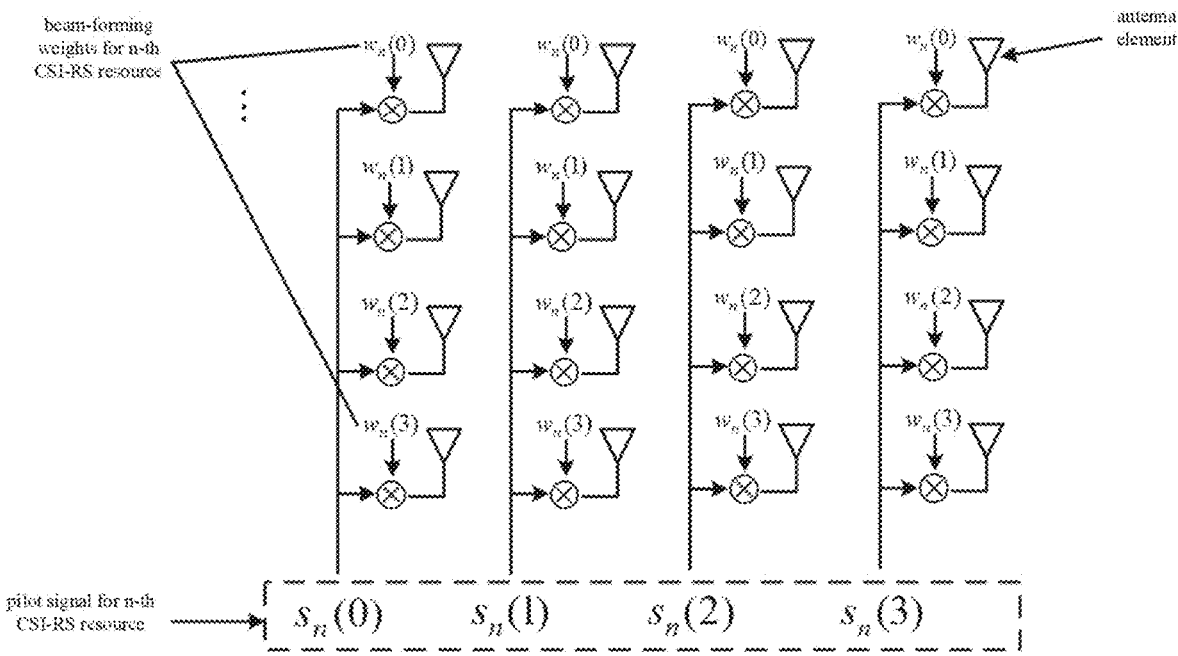
FIG. 5 schematically illustrates a transmission state of CSI-RS on antenna elements.
Figure 6:
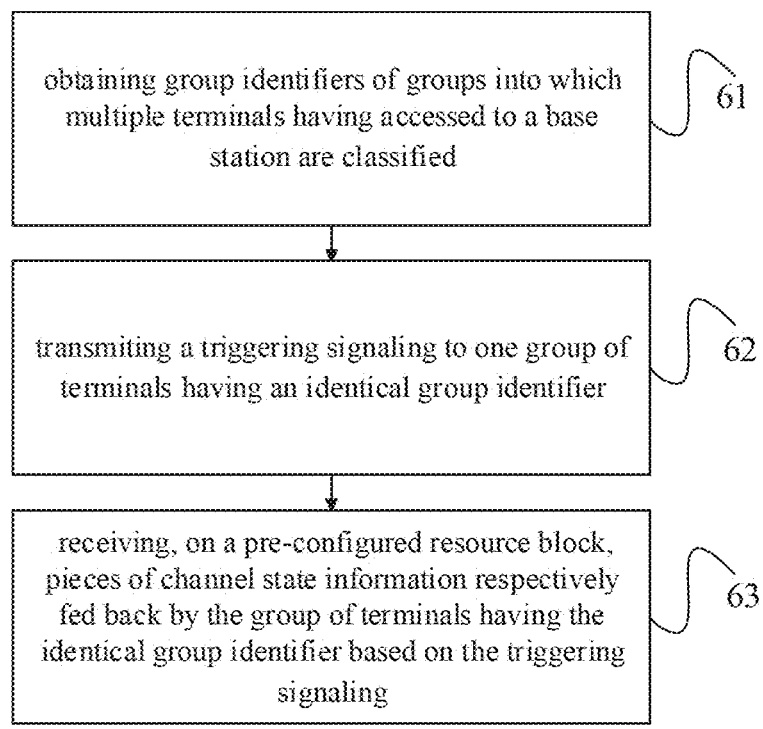
FIG. 6 is a flow chart of a receiving method according to at least some embodiments of the present disclosure.

As shown in FIG. 6, a channel state information receiving method according to at least some embodiments of the present disclosure includes steps 61-63.

Step 61 includes obtaining group identifiers of groups into which multiple terminals having accessed to a base station are classified. It should be noted that, each terminal is assigned with one group identifier when accessing to the base station. For triggering a channel state information feedback, the base station firstly needs to determine which group of terminals or which groups of terminals are to be triggered to feed back channel state information.

In step 62, a triggering signaling is transmitted to one group of terminals having an identical group identifier. It should be noted that one or multiple triggering signalings can be transmitted as long as one triggering signaling transmitted by the base station can only trigger one group of terminals to feed back channel state information.

In step 63, pieces of channel state information respectively fed back by the group of terminals having the identical group identifier based on the triggering signaling are received on a pre-configured resource block. It should be noted that, the pre-configured resource block is configured by the base station for the terminals and is used to receive pieces of channel state information fed back by the terminals. One pre-configured resource block only receives pieces of channel state information reported by terminals classified into an identical group. Pieces of channel state information reported by different groups need to be fed back to different resource blocks.

It should be noted that, the above-described channel state information receiving method is applied to a base station side.

It should be noted that, the triggering signaling may be downlink control information (DCI), a static control signaling or a semi-static control signaling such as a radio resource control (RRC) signaling. In the present disclosure, it is mainly described based on an example that the triggering signaling is the DCI.

For triggering the reporting of the channel state information, the base station needs to acquire information about terminals included in each group. Hence, before step 61, the receiving method further includes: step 60, assigning one group identifier for each terminal accessing to the base station.

It should be noted that, optionally according to some embodiments of the present disclosure, step 60 may include step 601, assigning one group identifier for each terminal accessing to the base station using a formula: group identifier=M Mod N1. Here, M is a total quantity of terminals having accessed to the base station recorded by the base station at a time instant when each terminal accesses to the base station, N1 is a total quantity of groups configured by the base station for multiple terminals having accessed to the base station, and Mod refers to remainder calculation.

In step 601, each time when one new terminal accesses, the base station may calculate to which group the new terminal belongs based on the total quantity of terminals having accessed to the base station recorded by the base station and the total quantity of groups. For example, the base station configures 100 groups for the terminals, those 100 groups being numbered starting with 0. When a new terminal accesses, it is recorded by the base station that 230 terminals have accessed to the base station at this time instant, since 230Mod100=30, it can be know that the new terminal belongs to a group numbered 30.

It should be noted that step 601 emphasizes in that each time when one new terminal accesses to the base station, the base station assigns one group identifier for the new terminal.

Practically, step 60 may include step 602, randomly assigning a group identifier for at least one terminal among multiple terminals having accessed to the base station. Implementation of step 602 is simple: when one new terminal accesses, the base station may allocate the new terminal to a group according to a preset rule. For example, terminals may be allocated into groups according to a rotational rule, that is, successively accessed terminals are respectively allocated to groups with identifiers in an ascending order from a smallest number, and when one terminal is allocated to a group with an identifier of a largest number, a next accessed terminal is to be allocated to a group with an identifier of the smallest number, and so forth.

It should be noted that in step 602, a group identifier can be assigned to each terminal when the each terminal accesses to the base station or group identifiers can be unifiedly assigned at a pre-appointed time instant to multiple terminals that have accessed to the base station, as long as group identifiers have been assigned to the terminals before using the group identifiers.

Practically, step 60 may include step 603, assigning one group identifier for each terminal accessing to the base station using a formula: group identifier=terminal identifier Mod N1, where N1 is a total quantity of groups configured by the base station for multiple terminals having accessed to the base station and Mod refers to remainder calculation.

It should be noted that, each terminal is classified into one group based on the terminal identifier of the each terminal, here the terminal identifier can be a unique serial number of the terminal.

It should be noted that in step 603, a group identifier can be assigned to each terminal when the each terminal accesses to the base station or group identifiers can be unifiedly assigned at a pre-appointed time instant to multiple terminals that have accessed to the base station, as long as group identifiers have been assigned to the terminals before using the group identifiers.

It should be noted that in step 601 and 602, the group identifiers are assigned by the base station for the terminals accessing to the base station, in the case that step 60 includes step 601 or step 602, step 60 further includes a step of transmitting the group identifiers to corresponding terminals. The terminal identifier is utilized in step 603, which can be acquired by the terminal accessing to the base station; hence, the group identifier obtained by the base station is identical to the group identifier obtained by the terminal as long as the base station and the terminal utilize the same rule. In the case step 60 includes step 603, the base station does not need to transmit group identifiers to the terminals.

In the embodiments of the present disclosure, each terminal accessing to the base station is classified into one group in advance, the base station transmits a triggering signaling to one group of terminals to trigger terminals classified into an identical group to perform channel state information feedback, and pieces of channel state information reported by multiple terminal classified into the identical group can be received on the same resource block. In this way, consumption of downlink signalings from the base station is reduced and efficiency in feeding back channel state information is improved.

Figure 7:
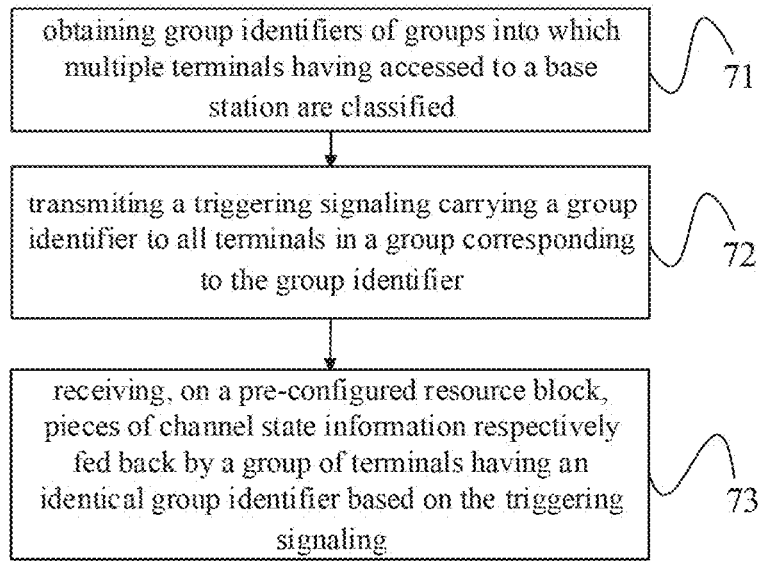
FIG. 7 is a flow chart of a receiving method according to at least some embodiments of the present disclosure.

As shown in FIG. 7, a channel state information receiving method according to at least some embodiments of the present disclosure includes steps 71-73.

Step 71 includes obtaining group identifiers of groups into which multiple terminals having accessed to a base station are classified.

In step 72, a triggering signaling carrying a group identifier is transmitted to all terminals in a group corresponding to the group identifier. It should be noted that by carrying the group identifier in the triggering signaling, the transmission of the triggering signaling becomes purposeful, only terminals classified into the group corresponding to the group identifier can receive and analyze the triggering signaling.

In step 73, pieces of channel state information respectively fed back by a group of terminals having an identical group identifier based on the triggering signaling are received on a pre-configured resource block.

In the embodiments of the present disclosure, the triggering signaling transmitted by the base station carries the group identifier, and it is already determined, at the transmission of the triggering signaling, that the triggering signaling is used to trigger all terminals in the group corresponding to the group identifier to feed back channel state information. In this way, the base station can trigger multiple terminals to feed back channel state information by transmitting one triggering signaling, thereby reducing downlink signalings to be transmitted.

It should be noted that, the triggering signaling may further carry a size of the pre-configured resource block, location information of the pre-configured resource block in a resource set configured by the base station, and triggering state information used to trigger the terminal to feed back channel state information. The terminal feeds back the channel state information based on all above-mentioned information carried on the triggering signaling.

Figure 8:
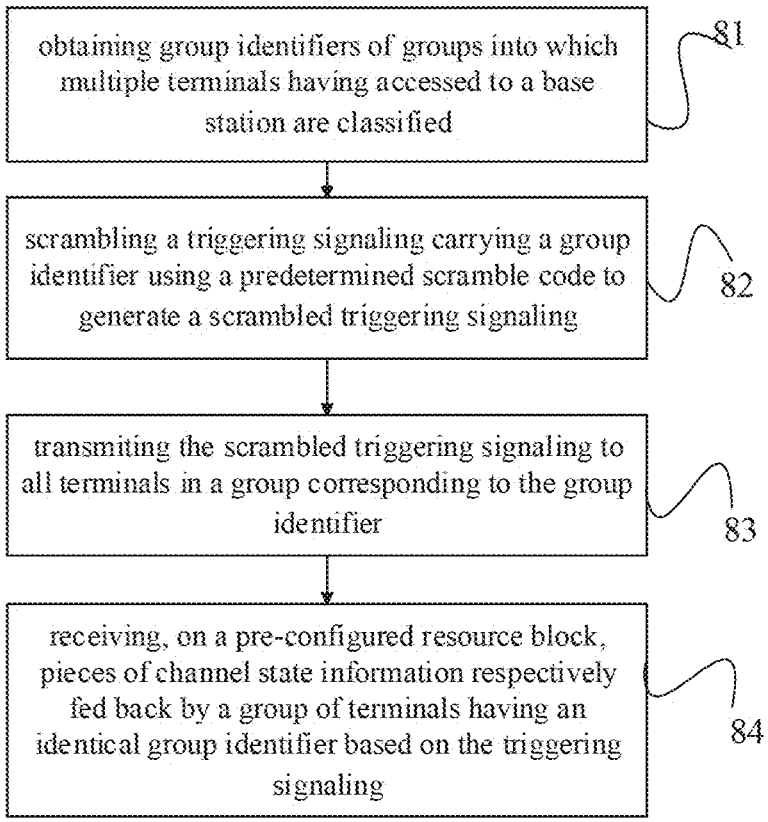
FIG. 8 is a flow chart of a receiving method according to at least some embodiments of the present disclosure.

As shown in FIG. 8, a channel state information receiving method according to at least some embodiments of the present disclosure includes steps 81-84.

Step 81 includes obtaining group identifiers of groups into which multiple terminals having accessed to a base station are classified.

In step 82, a triggering signaling carrying a group identifier is scrambled using a predetermined scramble code to generate a scrambled triggering signaling. The predetermined scramble code is obtained based on the group identifier. It should be noted that, the base station pre-configure a way of converting the group identifier to the predetermined scramble code and informs the terminal of the pre-configured way. In reception of the scrambled triggering signaling, the terminal may descramble the scrambled triggering signaling based on the pre-configured way.

In step 83, the scrambled triggering signaling is transmitted to all terminals in a group corresponding to the group identifier.

In step 84, pieces of channel state information respectively fed back by a group of terminals having an identical group identifier based on the triggering signaling are received on a pre-configured resource block. It should be noted that according to the embodiments, the triggering signaling to be transmitted is scrambled using the group identifier such that secure transmission of the triggering signaling is ensured. In addition, only the terminals belonging to the group corresponding to the group identifier can analyze the triggering signaling; therefore, the triggering signaling may not erroneously trigger terminals.

Figure 9:
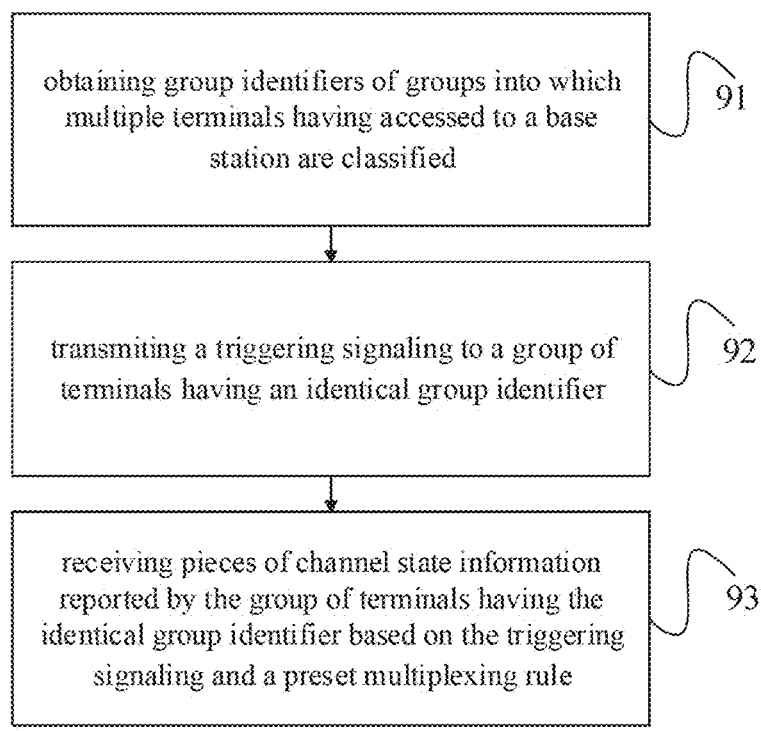
FIG. 9 is a flow chart of a receiving method according to at least some embodiments of the present disclosure.

As shown in FIG. 9, a channel state information receiving method according to at least some embodiments of the present disclosure includes steps 91-93.

Step 91 includes obtaining group identifiers of groups into which multiple terminals having accessed to a base station are classified.

In step 92, a triggering signaling is transmitted to a group of terminals having an identical group identifier.

In step 93, pieces of channel state information reported by the group of terminals having the identical group identifier based on the triggering signaling and a preset multiplexing rule are received.

It should be noted that the preset multiplexing rule may include but is not limited to time division multiplexing, frequency division multiplexing, code division multiplexing and time-frequency-code multiplexing.

Figure 10:
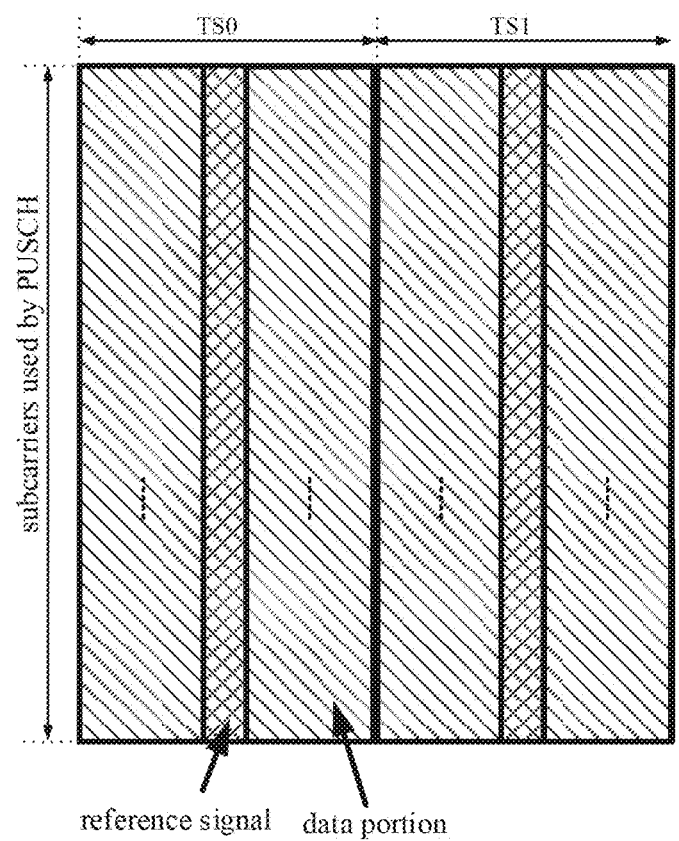
FIG. 10 schematically illustrates a format of an uplink resource for time division multiplexing feedback.

The time division multiplexing is exemplarily described as follows. For example, as shown in FIG. 10, one subframe used by a PUSCH includes two time slots TS0 and TS1, one terminal reports on TS0 and anther terminal reports on TS1. In this way, two terminals can be multiplexed in one subframe. Optionally, TS0 and TS1 may be divided based on quantities of symbols and different terminals report on different symbols.

The frequency division multiplexing may be implemented as follows. One physical resource block (PRB) includes 12 subcarriers and each terminal occupies one subcarrier for reporting; hence, 12 terminals can be multiplexed on one PRB. Alternatively, one terminal may occupy several subcarriers for reporting.

The code division multiplexing is described as follows. Each terminal has a corresponding code sequence. Information to be reported is extended using the code sequence or using a mask and then mapped to all resource blocks or a part of resource blocks.

By using the multiplexing rule, pieces of channel state information reported by a group of terminals are multiplexed on one resource block, such that the base station can obtain channel state information of multiple terminals by analyzing one resource block, reducing resource consumption of the base station.

Figure 11:
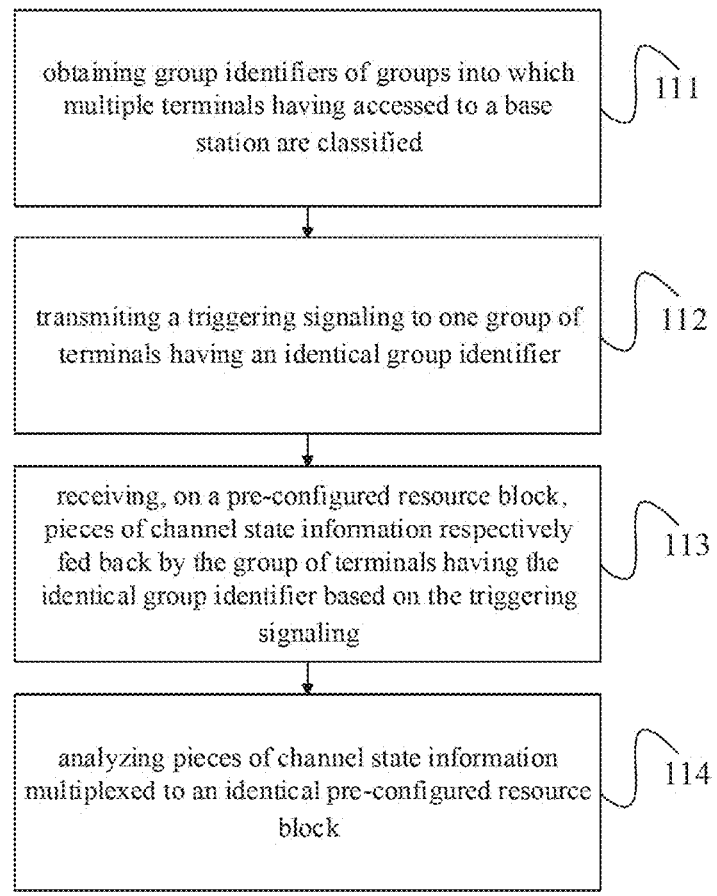
FIG. 11 is a flow chart of a receiving method according to at least some embodiments of the present disclosure.

As shown in FIG. 11, a channel state information receiving method according to at least some embodiments of the present disclosure includes steps 111-114.

Step 111 includes obtaining group identifiers of groups into which multiple terminals having accessed to a base station are classified.

In step 112, a triggering signaling is transmitted to one group of terminals having an identical group identifier.

In step 113, pieces of channel state information respectively fed back by the group of terminals having the identical group identifier based on the triggering signaling are received on a pre-configured resource block.

In step 114, pieces of channel state information multiplexed to an identical pre-configured resource block are analyzed.

Step 114 can be implemented as follows. Pieces of channel state information respectively reported by one group of terminals are extracted from each pre-configured resource block according to the preset multiplexing rule, and then the base station performs subsequent information processing based on the channel state information obtained through analyzing.

Taking the reporting of beam index (BI) in the channel state information as an example, a detailed implementation of the present disclosure is described as follows.

1. When each terminal accesses to a base station, the base station assigns a group identifier for the each terminal randomly or according to a predetermined rule. The group identifier represents a group to which the terminal belongs. Then, the base station transmits the group identifier to a corresponding terminal via RRC.

2. In the case that the base station needs to trigger a terminal to report BI, the base station selects the group identifier of one group of terminals that need to perform BI reporting and then transmits scrambled DCI carrying the group identifier to the group of terminals. It should be noted that the DCI may further include a size of a resource block for receiving the reported BI and a location of the resource block in a resource set configured by the base station. The DCI may further include a quantity of BI to be fed back by a terminal, i.e., a best BI to be fed back or multiple pieces of BI to be fed back.

3. In reception of the DCI, the terminals in the group corresponding to the group identifier in the DCI performs BI reporting based on information in the DCI. The terminals in one group respectively report pieces of BI corresponding to the terminals to an identical designated resource block.

4. The base station receives multiple pieces of BI corresponding to multiple terminals on the designated resource block and analyze the received pieces of BI.

Figure 12:
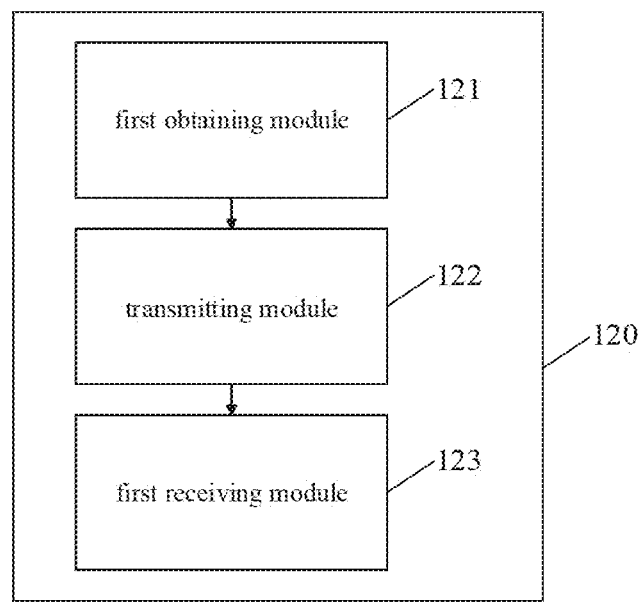
FIG. 12 is a schematic block diagram of a receiving device according to some embodiments of the present disclosure.

As shown in FIG. 12, a channel state information receiving device 120 is provided according to at least some embodiments of the present disclosure, including:

a first obtaining module 121, used to obtain group identifiers of groups into which multiple terminals having accessed to a base station are classified;

a transmitting module 122, used to transmit a triggering signaling to one group of terminals having an identical group identifier; and a first receiving module 123, used to receive, on a pre-configured resource block, pieces of channel state information respectively fed back by the group of terminals having the identical group identifier based on the triggering signaling.

Optionally, group identifiers can be assigned with the following approaches:

assigning one group identifier for each terminal accessing to the base station using a formula: group identifier=M Mod N1, where M is a total quantity of terminals having accessed to the base station recorded by the base station at a time instant when each terminal accesses to the base station, N1 is a total quantity of groups configured by the base station for multiple terminals having accessed to the base station, and Mod refers to remainder calculation; or randomly assigning a group identifier for at least one terminal among multiple terminals having accessed to the base station; or assigning one group identifier for each terminal accessing to the base station using a formula: group identifier=terminal identifier Mod N1, where N1 is a total quantity of groups configured by the base station for multiple terminals having accessed to the base station and Mod refers to remainder calculation.

The transmitting module 122 is specifically used to transmit a triggering signaling carrying a group identifier to all terminals in a group corresponding to the group identifier.

Optionally, the triggering signaling may be downlink control information (DCI), a static control signaling or a semi-static control signaling.

Optionally, the triggering signaling further carries a size of the pre-configured resource block, location information of the pre-configured resource block in a resource set configured by the base station, and triggering state information used to trigger the terminal to feed back channel state information.

The transmitting module 122 may further include:

a scrambling unit, used to scramble a triggering signaling carrying a group identifier using a predetermined scramble code to generate a scrambled triggering signaling, where the predetermined scramble code is obtained based on the group identifier; and a transmitting unit, used to transmit the scrambled triggering signaling to all terminals in a group corresponding to the group identifier.

The first receiving module 123 is specifically used to receive, on the pre-configured resource block, pieces of channel state information reported by the group of terminals having the identical group identifier based on the triggering signaling and a preset multiplexing rule. The preset multiplexing rule may include time division multiplexing, frequency division multiplexing, code division multiplexing and time-frequency-code multiplexing.

Optionally, the receiving device 120 further includes:

an analyzing module, used to analyze pieces of channel state information received on an identical pre-configured resource block.

It should be noted that the receiving device according to the embodiments corresponds to the receiving method according to the foregoing embodiments. All implementations in the receiving method according to the foregoing embodiments can be applied to the receiving device according to the embodiments and similar technical effects can be achieved.

Figure 13:
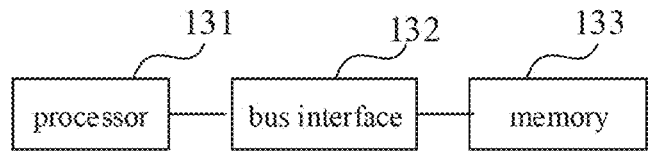
FIG. 13 is a schematic diagram of a base station according to some embodiments of the present disclosure.

As shown in FIG. 13, a base station is provided according to at least some embodiments of the present disclosure, including: a processor 131 and a memory 133 connected to the processor 131 via a bus interface 132. The memory 133 is used to store program and data used by the processor 131 when the processor 131 executes operations.

When the processor 131 calls the data and executes the program stored in the memory 133, the following functional modules are realized:

a first obtaining module, used to obtain group identifiers of groups into which multiple terminals having accessed to a base station are classified;

a transmitting module, used to transmit a triggering signaling to one group of terminals having an identical group identifier; and a first receiving module, used to receive, on a pre-configured resource block, pieces of channel state information respectively fed back by the group of terminals having the identical group identifier based on the triggering signaling.

The processor 131 may optionally be used to achieve a function of any other module of the receiving device according to the foregoing embodiments.

It should be noted by the ordinary skilled in the art that all of or part of steps of the foregoing embodiments can be achieved through hardware or can be achieved by related hardware instructed by computer program. The computer program includes instructions for executing all of or part of the steps of the methods. The computer program can be stored in a readable storage medium, where the storage medium can be in any forms.

Figure 14:
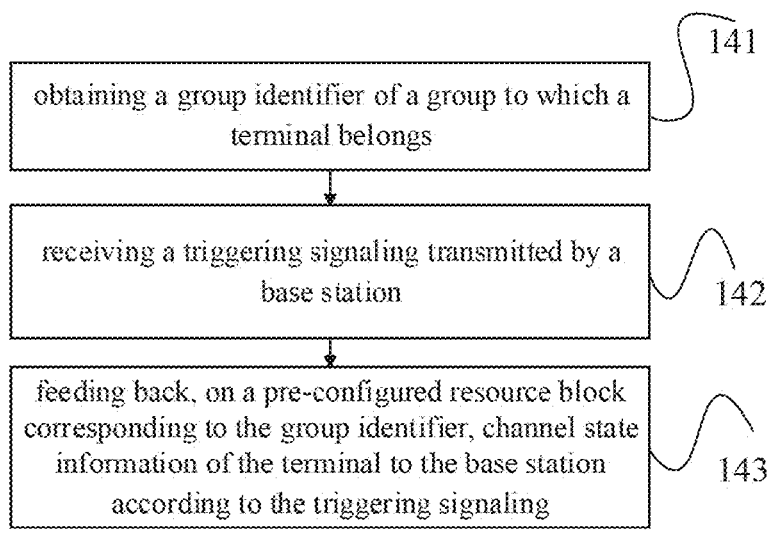
FIG. 14 is flow chart of a feedback method according to at least some embodiments of the present disclosure.

Corresponding to the foregoing channel state information receiving method, as shown in FIG. 14, a channel state information feedback method is provided according to at least some embodiments of the present disclosure, including:

step 141, obtaining a group identifier of a group to which a terminal belongs;

step 142, receiving a triggering signaling transmitted by a base station; and step 143, feeding back, on a pre-configured resource block corresponding to the group identifier, channel state information of the terminal to the base station according to the triggering signaling, where the pre-configured resource block is allocated by the base station for all terminals in the group corresponding to the group identifier.

It should be noted that the feedback method is applied to the terminal side and the triggering signaling may include DCI, a static control signaling or a semi-static control signaling.

In practical implementation, step 141 may optionally include step 1411, obtaining the group identifier that is assigned by the base station for the terminal using a formula: group identifier=M Mod N1. Here, M is a total quantity of terminals having accessed to the base station recorded by the base station at a time instant when the terminal accesses to the base station, N1 is a total quantity of groups configured by the base station for multiple terminals having accessed to the base station, and Mod refers to remainder calculation.

In practical implementation, step 141 may optionally include step 1412, obtaining the group identifier that is randomly assigned by the base station for the terminal accessing to the base station.

In practical implementation, step 141 may optionally include step 1413, obtaining the group identifier of the terminal using a formula: group identifier=terminal identifier Mod N1, where N1 is a total quantity of groups configured by the base station for multiple terminals having accessed to the base station and Mod refers to remainder calculation.

It should be noted that for steps 1411 and 1412, the group identifier transmitted by the base station is received directly, while for step 1413, the terminal calculates the group identifier based on a rule preset by the base station.

Figure 15:
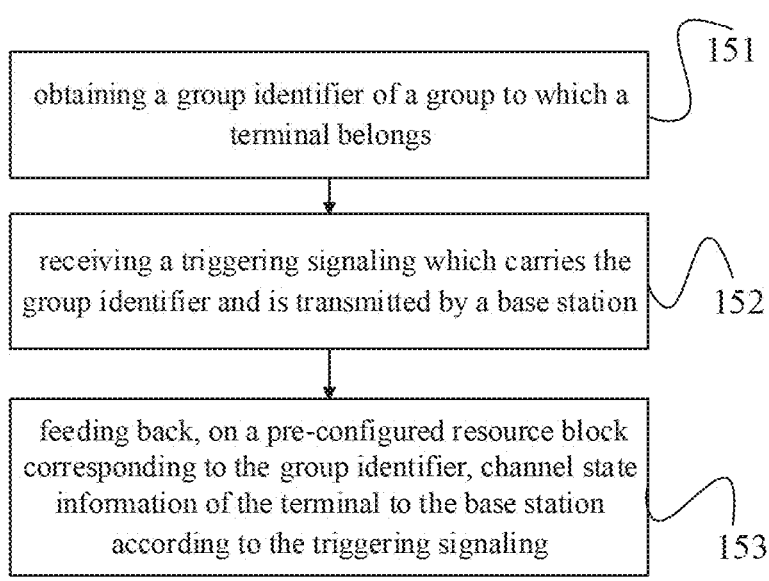
FIG. 15 is flow chart of a feedback method according to at least some embodiments of the present disclosure.

As shown in FIG. 15, a channel state information feedback method is provided according to at least some embodiments of the present disclosure, including:

step 151, obtaining a group identifier of a group to which a terminal belongs;

step 152, receiving a triggering signaling which carries the group identifier and is transmitted by a base station;

step 153, feeding back, on a pre-configured resource block corresponding to the group identifier, channel state information of the terminal to the base station according to the triggering signaling, where the pre-configured resource block is allocated by the base station for all terminals in the group corresponding to the group identifier.

Optionally, the triggering signaling may further carry a size of the pre-configured resource block, location information of the pre-configured resource block in a resource set configured by the base station, and triggering state information used to trigger the terminal to feed back channel state information.

Furthermore, step 153 may include: feeding back, on the pre-configured resource block corresponding to the group identifier, the channel state information of the terminal to the base station according to the triggering signaling and using a preset multiplexing rule. The preset multiplexing rule may include time division multiplexing, frequency division multiplexing, code division multiplexing and time-frequency-code multiplexing.

It should be noted that, when the terminal performing the feedback method communicates with the base station, consumption of uplink channel resource is reduced and the efficiency of the terminal in feeding back the channel state information is improved.

Figure 16:
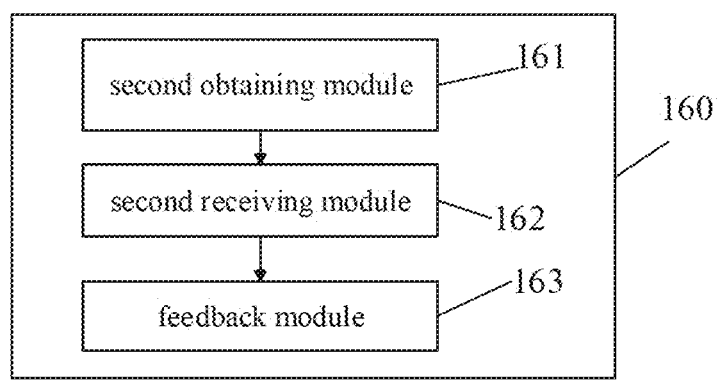
FIG. 16 is a schematic block diagram of a feedback device according to some embodiments of the present disclosure.

As shown in FIG. 16, a channel state information feedback device is provided according to at least some embodiments of the present disclosure, including:

a second obtaining module 161, used to obtain a group identifier of a group to which a terminal belongs;

a second receiving module 162, used to receive a triggering signaling transmitted by a base station; and a feedback module 163, used to feed back, on a pre-configured resource block corresponding to the group identifier, channel state information of the terminal to the base station according to the triggering signaling, where the pre-configured resource block is allocated by the base station for all terminals in the group corresponding to the group identifier.

The second obtaining module 161 is specifically used to:

obtain the group identifier that is assigned by the base station for the terminal using a formula: group identifier=M Mod N1, where M is a total quantity of terminals having accessed to the base station recorded by the base station at a time instant when the terminal accesses to the base station, N1 is a total quantity of groups configured by the base station for multiple terminals having accessed to the base station, and Mod refers to remainder calculation; or obtain the group identifier that is randomly assigned by the base station for the terminal accessing to the base station; or obtain the group identifier of the terminal using a formula: group identifier=terminal identifier Mod N1, where N1 is a total quantity of groups configured by the base station for multiple terminals having accessed to the base station and Mod refers to remainder calculation.

The second receiving module 162 is specifically used to receive a triggering signaling that is transmitted by the base station and carries the group identifier.

Furthermore, the triggering signaling may include downlink control information (DCI), a static control signaling or a semi-static control signaling.

Optionally, the triggering signaling may further carry a size of the pre-configured resource block, location information of the pre-configured resource block in a resource set configured by the base station, and triggering state information used to trigger the terminal to feed back channel state information.

The feedback module 163 is specifically used to feed back, on the pre-configured resource block corresponding to the group identifier, the channel state information of the terminal to the base station according to the triggering signaling and using a preset multiplexing rule. The preset multiplexing rule may include time division multiplexing, frequency division multiplexing, code division multiplexing and time-frequency-code multiplexing.

It should be noted that the feedback device according to the embodiments corresponds to the feedback method according to the foregoing embodiments. All implementations in the feedback method according to the foregoing embodiments can be applied to the feedback device according to the embodiments and similar technical effects can be achieved.

Figure 17:
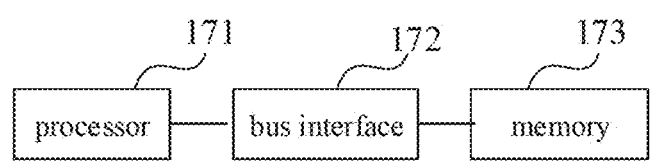
FIG. 17 is a schematic diagram of a terminal according to some embodiments of the present disclosure.

As shown in FIG. 17, a terminal is provided according to at least some embodiments of the present disclosure, including: a processor 171 and a memory 173 connected to the processor 171 via a bus interface 172. The memory 173 is used to store program and data used by the processor 171 when the processor 171 executes operations.

When the processor 171 calls the data and executes the program stored in the memory 173, the following functional modules are realized:

a second obtaining module 161, used to obtain a group identifier of a group to which a terminal belongs;

a second receiving module 162, used to receive a triggering signaling transmitted by a base station; and a feedback module 163, used to feed back, on a pre-configured resource block corresponding to the group identifier, channel state information of the terminal to the base station according to the triggering signaling, where the pre-configured resource block is allocated by the base station for all terminals in the group corresponding to the group identifier.

The processor 171 can be used to achieve a function of any other module of the foregoing feedback device.

It should be noted by the ordinary skilled in the art that all of or part of steps of the foregoing embodiments can be achieved through hardware or can be achieved by related hardware instructed by computer program. The computer program includes instructions for executing all of or part of the steps of the methods. The computer program can be stored in a readable storage medium, where the storage medium can be in any forms.

Preferred embodiments of the present disclosure are as described above. It should be noted that the ordinary skilled in the art can make various changes and modifications without departing from the principle of the present disclosure. The present intends to include all these changes and modifications.

What is claimed is:

1. A channel state information receiving method, comprising:
    in aperiodic CSI feedback, obtaining group identifiers of groups into which a plurality of terminals having accessed to a base station is classified, wherein one of the group identifiers is assigned by the base station to one terminal when the one terminal accesses to the base station;
    transmitting a triggering signaling to one group of terminals having an identical group identifier, wherein the triggering signaling comprises a pre-configured resource block configured by the base station for the group of terminals having the identical group identifier; and
    receiving, on the pre-configured resource block, pieces of channel state information respectively fed back by only the group of terminals having the identical group identifier based on the triggering signaling;
    assigning one group identifier for each terminal accessing to the base station using a formula: group identifier=M Mod N1, where M is a total quantity of terminals having accessed to the base station recorded by the base station at a time instant when each terminal accesses to the base station, N1 is a total quantity of groups configured by the base station for the plurality of terminals having accessed to the base station, and Mod refers to a remainder calculation;
    wherein the transmitting the triggering signaling to one group of terminals having the identical group identifier comprises: transmitting the triggering signaling carrying the group identifier to all terminals in the group corresponding to the group identifier;
    wherein the transmitting the triggering signaling carrying the group identifier to all terminals in the group corresponding to the group identifier comprises:
    scrambling the triggering signaling carrying the group identifier using a predetermined scramble code to generate a scrambled triggering signaling, wherein the predetermined scramble code is obtained based on the group identifier; and
    transmitting the scrambled triggering signaling to all terminals in the group corresponding to the group identifier.

2. The channel state information receiving method according to claim 1, wherein the triggering signaling further comprises a size of the pre-configured resource block, location information of the pre-configured resource block in a resource set configured by the base station, and triggering state information used to trigger the terminals to feed back channel state information.

3. The channel state information receiving method according to claim 1, wherein the receiving, on the pre-configured resource block, the pieces of channel state information respectively fed back by only the group of terminals having the identical group identifier based on the triggering signaling further comprises:
    receiving, on the pre-configured resource block, the pieces of channel state information reported by only the group of terminals having the identical group identifier based on the triggering signaling and a preset multiplexing rule, wherein the preset multiplexing rule comprises time division multiplexing, frequency division multiplexing, code division multiplexing and time-frequency-code multiplexing.

4. The channel state information receiving method according to claim 1, wherein after the receiving, on the pre-configured resource block, the pieces of channel state information respectively fed back by the group of terminals having the identical group identifier based on the triggering signaling, the channel state information receiving method further comprises:
    analyzing the pieces of channel state information received on an identical pre-configured resource block.

5. A channel state information receiving device, comprising:
    a processor and a memory connected to the processor via a bus interface, the memory being configured to store program and data used by the processor when the processor executes operations;
    wherein when calling the data and executing the program stored in the memory, the processor implements the following functional modules:
    a first obtaining module, configured to, in aperiodic CSI feedback, obtain group identifiers of groups into which a plurality of terminals having accessed to a base station is classified, wherein one of the group identifiers is assigned by the base station to one terminal when the one terminal accesses to the base station;
    a transmitting module, configured to transmit a triggering signaling to one group of terminals having an identical group identifier, wherein the triggering signaling comprises a pre-configured resource block configured by the base station for the group of terminals having the identical group identifier; and
    a first receiving module, configured to receive, on the pre-configured resource block, pieces of channel state information respectively fed back by only the group of terminals having the identical group identifier based on the triggering signaling;
    assigning one group identifier for each terminal accessing to the base station using a formula: group identifier=M Mod N1, where M is a total quantity of terminals having accessed to the base station recorded by the base station at a time instant when each terminal accesses to the base station, N1 is a total quantity of groups configured by the base station for the plurality of terminals having accessed to the base station, and Mod refers to a remainder calculation;
    wherein the transmitting module is configured to transmit the triggering signaling carrying the group identifier to all terminals in the group corresponding to the group identifier;
    wherein the transmitting module comprises:

a scrambling unit, configured to scramble the triggering signaling carrying the group identifier using a predetermined scramble code to generate a scrambled triggering signaling, wherein the predetermined scramble code is obtained based on the group identifier; and a transmitting unit, configured to transmit the scrambled triggering signaling to all terminals in the group corresponding to the group identifier.

* * * * *